US012408001B2

(12) United States Patent
Welti

(10) Patent No.: US 12,408,001 B2
(45) Date of Patent: Sep. 2, 2025

(54) RENDERING OF AUDIO SIGNALS USING VIRTUALIZED REVERBERATION

(71) Applicant: HARMAN INTERNATIONAL INDUSTRIES, INCORPORATED, Stamford, CT (US)

(72) Inventor: Todd S. Welti, Thousand Oaks, CA (US)

(73) Assignee: Harman International Industries, Incorporated, Stamford, CT (US)

( * ) Notice: Subject to any disclaimer, the term of this patent is extended or adjusted under 35 U.S.C. 154(b) by 279 days.

(21) Appl. No.: 18/336,267

(22) Filed: Jun. 16, 2023

(65) Prior Publication Data

US 2024/0422501 A1 Dec. 19, 2024

(51) Int. Cl.
*H04S 7/00* (2006.01)
*H04S 3/00* (2006.01)

(52) U.S. Cl.
CPC .............. *H04S 7/306* (2013.01); *H04S 3/008* (2013.01); *H04S 7/304* (2013.01); *H04S 7/307* (2013.01);
(Continued)

(58) Field of Classification Search
None
See application file for complete search history.

(56) References Cited

U.S. PATENT DOCUMENTS

2016/0277865 A1* 9/2016 Lee .......................... H04S 3/008
2019/0147894 A1* 5/2019 Lee ........................ G10L 19/008
381/23
(Continued)

FOREIGN PATENT DOCUMENTS

EP 1 072 089 B1 3/2011
EP 3253079 B1 * 4/2023 ............. H03G 5/005
(Continued)

OTHER PUBLICATIONS

Engel, et al, "Perceptual Implications of different Ambisonics-based Methods for binaural Reverberation", Journal Acoustical Society of America 149(2), Feb. 4, 2021 pp. 895-910.
(Continued)

*Primary Examiner* — Qin Zhu
(74) *Attorney, Agent, or Firm* — Artegis Law Group, LLP

(57) ABSTRACT

A computer-implemented method for processing audio. The method includes obtaining a binaural room impulse response (BRIR) of an acoustic space, receiving an input audio signal, separating the input audio signal into low-frequency components and high-frequency components, and dividing the BRIR of the acoustic space into a first portion that occurs before a first time and a second portion that occurs after the first time. The method further includes generating a first component of an output audio signal based on the high-frequency components of the input audio signal and the first portion of the BRIR, generating a second component of the output audio signal based on the high-frequency components of the input audio signal and the second portion of the BRIR, generating a third component of the output audio signal based on the low-frequency components of the input audio signal and the BRIR, and outputting the output audio signal.

20 Claims, 8 Drawing Sheets

(52) U.S. Cl.
CPC ....... *H04S 2400/01* (2013.01); *H04S 2400/11* (2013.01); *H04S 2400/13* (2013.01); *H04S 2400/15* (2013.01); *H04S 2420/11* (2013.01)

(56) References Cited

U.S. PATENT DOCUMENTS

| | | | | |
|---|---|---|---|---|
| 2021/0067897 | A1 | 3/2021 | Ehara et al. | |
| 2022/0159405 | A1* | 5/2022 | Neukam ................ | G10K 15/12<br>381/23 |

FOREIGN PATENT DOCUMENTS

| | | | | |
|---|---|---|---|---|
| KR | 102314510 | B1 * | 9/2014 | |
| WO | 99/49574 | A1 | 9/1999 | |
| WO | WO-2015102920 | A1 * | 7/2015 | ............. G10K 15/12 |

OTHER PUBLICATIONS

Engel, et al, "Reverberation and it Binaural Reproduction: The Tradeoff between Computational Efficiency and Perceiver Quality", IntechOpen, http://dx.doi.org/10.5772/intechopen.101940, 2022, pp. 1-19.

* cited by examiner

RENDERING OF AUDIO SIGNALS USING VIRTUALIZED REVERBERATION

BACKGROUND

Field of the Various Embodiments

The various embodiments relate generally to audio processing, and more specifically, to techniques for rendering audio signals using virtualized reverberation.

DESCRIPTION OF THE RELATED ART

Reverberation refers to the persistence of sound in an enclosed or semi-enclosed space after the sound has been produced by a source. When sound is produced in an acoustic space, such as a room, concert hall, movie theater, etc., the sound propagates from one or more sources as a series of sound waves. The propagating sound waves travel through the air and reflect off boundaries of the acoustic space, such as walls, ceilings, and floors, and/or objects included in the acoustic space. As the reflected sound waves continue to bounce off the boundary surfaces and other objects within the acoustic space, these reflections blend together and gradually decay over time as the sound energy is absorbed by surfaces and/or objects in the acoustic space.

To create a more immersive audio experience when using headphones or ear buds, the above-described reverberation effects can be artificially added to audio signals using digital signal processing techniques. For example, in music production, a sound engineer can render audio signals with reverberation to simulate the effects of listening to music in a particular acoustic environment, such as a concert hall or an auditorium. As another example, in film or game production, audio signals can be rendered with reverberation to recreate the sounds of acoustic environments depicted on screen, such as caves, corridors, or specific outdoor spaces. In other examples, such as augmented or virtual reality applications, audio signals rendered with reverberation allow users to perceive an enhanced sense of presence and immersion with the augmented or virtual world.

Various digital signal processing techniques and algorithms, which offer tradeoffs between computational efficiency and accuracy, can be used for rendering reverberation to simulate the effects of an acoustic space during playback of an audio signal. Some virtualized reverberation algorithms render reverberation in an audio signal by convolving the audio signal with a room impulse response (RIR). An RIR is the time-domain acoustic transfer function between a sound source and a receiver in a given acoustic space (e.g., a concert hall, an auditorium, etc.). The RIR of an acoustic space can be measured, for example using loudspeakers and a microphone, or simulated using acoustic modelling software. One drawback to convolving an audio signal with an RIR is that when using high order processing techniques, convolving the long reverberation tails included an RIR with the audio signal is computationally very expensive and time consuming.

Other techniques divide the RIR into a first window of direct, or early arriving, sound and a second window of reflected, or later arriving, sound (e.g., the reverberation tail). The window of direct sound in the RIR is convolved with the audio signal using high order, computationally intensive processing techniques. The window of reflected sound in the RIR is then separately convolved with the audio signal using lower order, less computationally intensive processing techniques. These additional techniques, however, typically use an RIR derived from a model of an acoustic space because it is difficult and computationally expensive to obtain windows of direct sound and reflected sound from a measured RIR of an acoustic space. When compared to a measured RIR of an acoustic space, an RIR derived from the model of an acoustic space can be difficult to obtain and/or generate and often fails to capture all of the reverberation effects of an acoustic space.

As the foregoing illustrates, what is needed are more effective techniques for rendering audio signals with reverberation.

SUMMARY

Various embodiments of the present disclosure set forth a computer-implemented method for processing audio. The method includes obtaining a binaural room impulse response (BRIR) of an acoustic space, receiving an input audio signal, separating the input audio signal into low-frequency components and high-frequency components, and dividing the BRIR of the acoustic space into a first portion that occurs before a first time and a second portion that occurs after the first time. The method further includes generating a first component of an output audio signal based on the high-frequency components of the input audio signal and the first portion of the BRIR, generating a second component of the output audio signal based on the high-frequency components of the input audio signal and the second portion of the BRIR, generating a third component of the output audio signal based on the low-frequency components of the input audio signal and the BRIR, and outputting the output audio signal Further embodiments provide, among other things, one or more non-transitory computer-readable media and systems configured to implement the method set forth above.

At least one technical advantage of the disclosed techniques relative to the prior art is that, with the disclosed techniques, the measured RIR of an acoustic space can be used to add reverberation to an audio signal with a lower computational cost. Accordingly, with the disclosed techniques, relatively modest processing power can be used to render reverberation for a large number of sound sources and acoustic spaces based on measured room impulse responses, which sound more natural than room impulse responses derived from models of acoustic spaces. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

Figure 1:
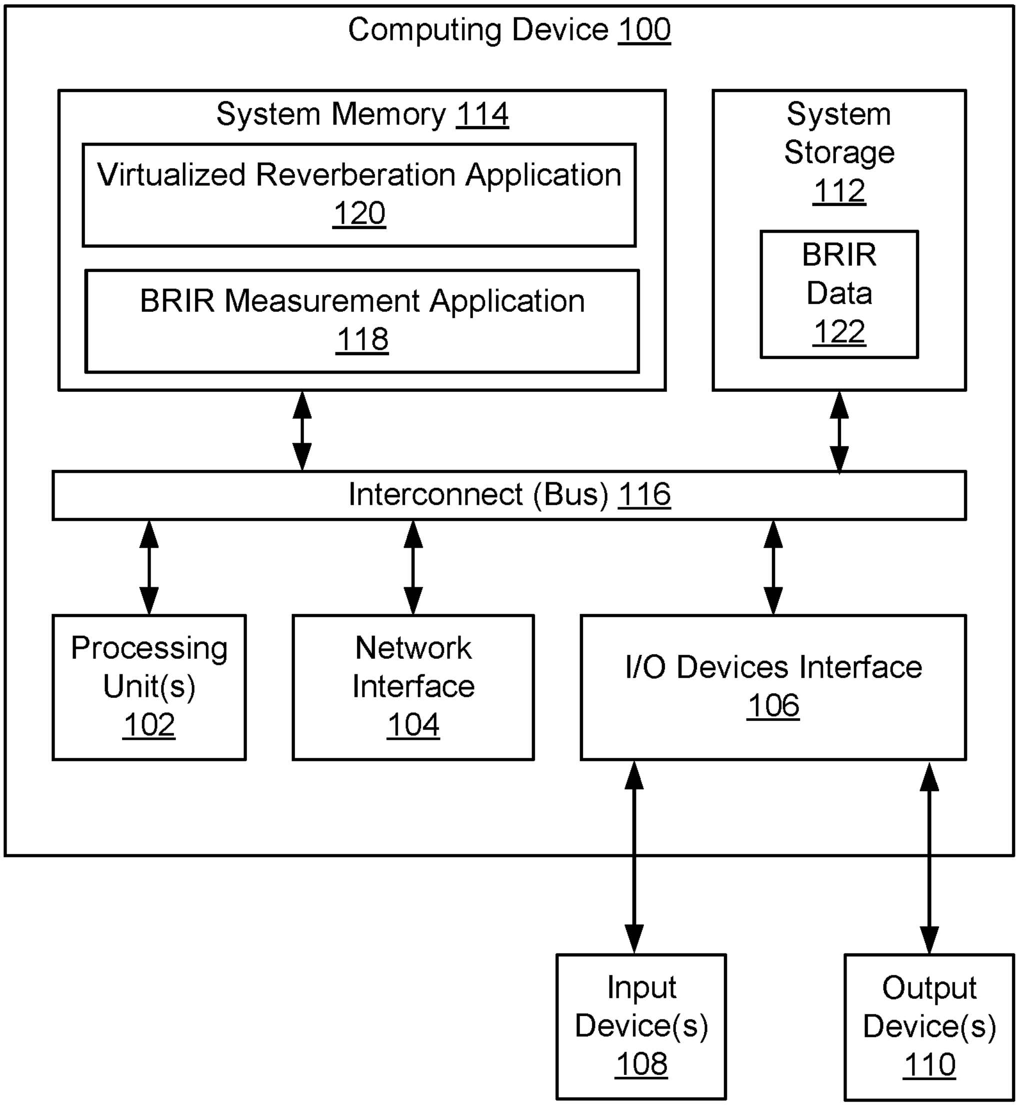
FIG. 1 is a block diagram of a computing device, according to one or more aspects of the various embodiments.

FIG. 1 is a block diagram of a computing device 100, according to various embodiments. As will be described in more detail below, computing device 100 can be used to render audio signals using virtualized reverberation techniques. Computing device 100 can be implemented as any type of computing device, such as a desktop computer, a laptop computer, a mobile device, a server, or a smart audio output device, suitable for practicing the various embodiments. As shown, computing device 100 includes, without limitation, one or more processing units 102, network interface 104, input/output (I/O) devices interface 106, input device(s) 108, output device(s) 110, system storage 112, and system memory 114. Computing device 100 further includes an interconnect 116 that is configured to facilitate transmission of data, such as programming instructions and application data, between processing unit(s) 102, network interface 104, I/O devices interface 106, system storage 112, and system memory 114.

Processing unit(s) 102 can be any technically feasible processing device configured to process data and execute program instructions. For example, processing unit(s) 102 could include one or more central processing units (CPUs), digital signal processors (DSPs), graphics processing units (GPUs), application-specific integrated circuits (ASICs), field-programmable gate arrays (FPGAs), microprocessors, microcontrollers, other types of processing units, and/or a combination of different processing units. Processing unit(s) 102 is configured to retrieve and execute programming instructions, such as binaural room impulse response (BRIR) measurement application 118 and virtualized reverberation application 120, stored in system memory 114. Similarly, processing unit(s) 102 is configured to store application data (e.g., software libraries) and retrieve application data from system storage 112 and/or system memory 114.

Computing device 100 can connect with other devices and/or networks via network interface 104. In some embodiments, network interface 104 is hardware, software, or a combination of hardware and software, that is configured to connect to and interface with one or more devices and/or networks. In some embodiments, network interface 104 facilitates communication with other devices or systems via one or more standard and/or proprietary protocols (e.g., Bluetooth, a proprietary protocol associated with a specific manufacturer, etc.)

I/O devices interface 106 is configured to receive input data from input device(s) 108 and transmit the input data to processing unit(s) 102 via interconnect 116. For example, input device(s) 108 can include one or more buttons, a keyboard, a mouse, a graphical user interface, a touchscreen display, a microphone, and/or other input devices. I/O devices interface 106 is further configured to receive output data from processing unit(s) 102 via interconnect 116 and transmit the output data to output device(s) 110. For example, output device(s) 110 can include one or more of a display device, a touchscreen display, a graphical user interface, a loudspeaker, and/or other output devices.

System storage 112 can include non-volatile storage for applications, software modules, and data, and can include fixed or removable disk drives, flash memory devices, and CD-ROM, DVD-ROM, Blu-Ray, HD-DVD, or other magnetic, optical, solid state storage devices, and/or the like. System storage 112 can be fully or partially located in a remote storage system, referred to herein as "the cloud," and accessed through network connections via network interface 104. System storage 112 is configured to store non-volatile data such as files (e.g., audio files, video files, subtitles, application files, software libraries, etc.). In one example, system storage 112 stores binaural room impulse response (BRIR) data 122 associated with the measured BRIRs of one or more acoustic spaces. A binaural room impulse response refers to the acoustic impulse response between a sound source and a listener's ears in an acoustic space. Thus, each BRIR includes a left ear component of the BRIR and a right car component of the BRIR.

System memory 114 can include a random access memory (RAM) module, a flash memory unit, or any other type of memory unit or combination thereof. One or more of processing unit(s) 102, network interface 104, and I/O devices interface 106, are configured to read data from and write data to system memory 114. System memory 114 includes various software programs and modules (e.g., an operating system, one or more applications) that can be executed by processing unit(s) 102 and application data (e.g., data loaded from system storage 112) associated with said software programs. For example, as will be described in more detail below, system memory 114 includes BRIR measurement application 118 and virtualized reverberation application 120.

Figure 2:
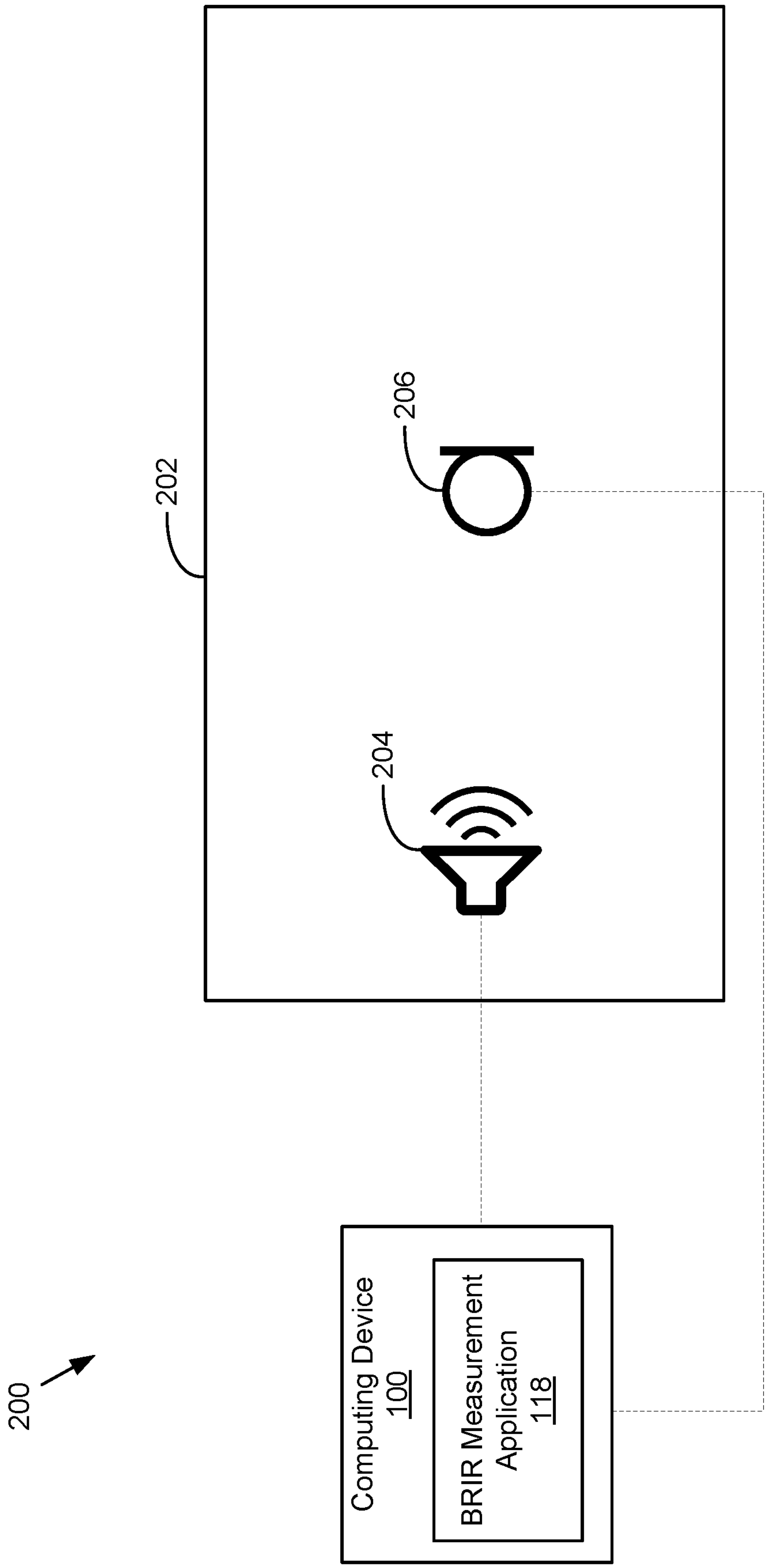
FIG. 2 is a block diagram of a system for measuring a binaural room impulse response of an acoustic space, according to one or more aspects of the various embodiments.

BRIR measurement application 118 can be executed by processing unit(s) 102 to measure the BRIR of an acoustic space and store the measured BRIR of the acoustic space as BRIR data 122 in system storage 112. FIG. 2 is a block diagram of an example system 200 for measuring the binaural room impulse response of an acoustic space 202. Acoustic space 202 can be any type of room or listening environment for which it is desired to simulate a listening experience with reverberation effects. For example, acoustic space 202 can be a concert hall, an auditorium, a theater, a stadium, or some other type of listening environment. As shown, system 200 includes computing device 100 executing BRIR measurement application 118, a loudspeaker 204, and an omni-directional microphone 206. Although loudspeaker 204 is illustrated as a single loudspeaker, in some embodiments, system 200 includes multiple loudspeakers distributed around acoustic space 202. In some embodiments, loudspeaker 204 includes multiple speaker drivers. For example, loudspeaker 204 includes one or more tweeters, mid-range drivers, and woofers.

In operation, BRIR measurement application 118 controls loudspeaker 204 to emit audio signals within acoustic space 202. Omni-directional microphone 206 records the emitted audio signals propagating through acoustic space 202 and BRIR measurement application 118 processes the recorded audio signals to determine the BRIR of acoustic space 202. BRIR measurement application 118 can use one or more known techniques, such as the maximum-length sequence (MLS) technique, the inverse repeated sequence (IRS) technique, the time-stretched pulses technique, or the logarithmic sinesweep technique, to measure and determine the BRIR of acoustic space 202. BRIR measurement application 118 then stores the measured BRIR of acoustic space 202 as BRIR data 122 in system storage 112. As described above, the BRIR of acoustic space 202 is the acoustic impulse response between a sound source and a listener's ears in acoustic space 202. Thus, the BRIR of acoustic space 202 includes a left ear component of the BRIR and a right car component of the BRIR.

Referring back to FIG. 1, when executed by processing unit(s) 102, virtualized reverberation application 120 renders audio signals with reverberation based on a measured BRIR of an acoustic space. For example, virtualized reverberation application 120 renders an audio signal with reverberation based on the BRIR of acoustic space 202 that was measured by BRIR measurement application 118 and stored as BRIR data 122 in system storage 112. Rendering an audio signal with reverberation based on a measured BRIR of an acoustic space includes adding reverberation to the audio signal to simulate the effects of listening to the playback of audio in the acoustic space. In some embodiments, when rendering an audio signal with reverberation based on a measured BRIR, virtualized reverberation application 120 filters, or separates, the measured BRIR into the mid-to-high-frequency components of the measured BRIR and the low-frequency components of the measured BRIR. As used herein, the term mid-to-high-frequency can be used interchangeably with the term high-frequency.

Figure 3:
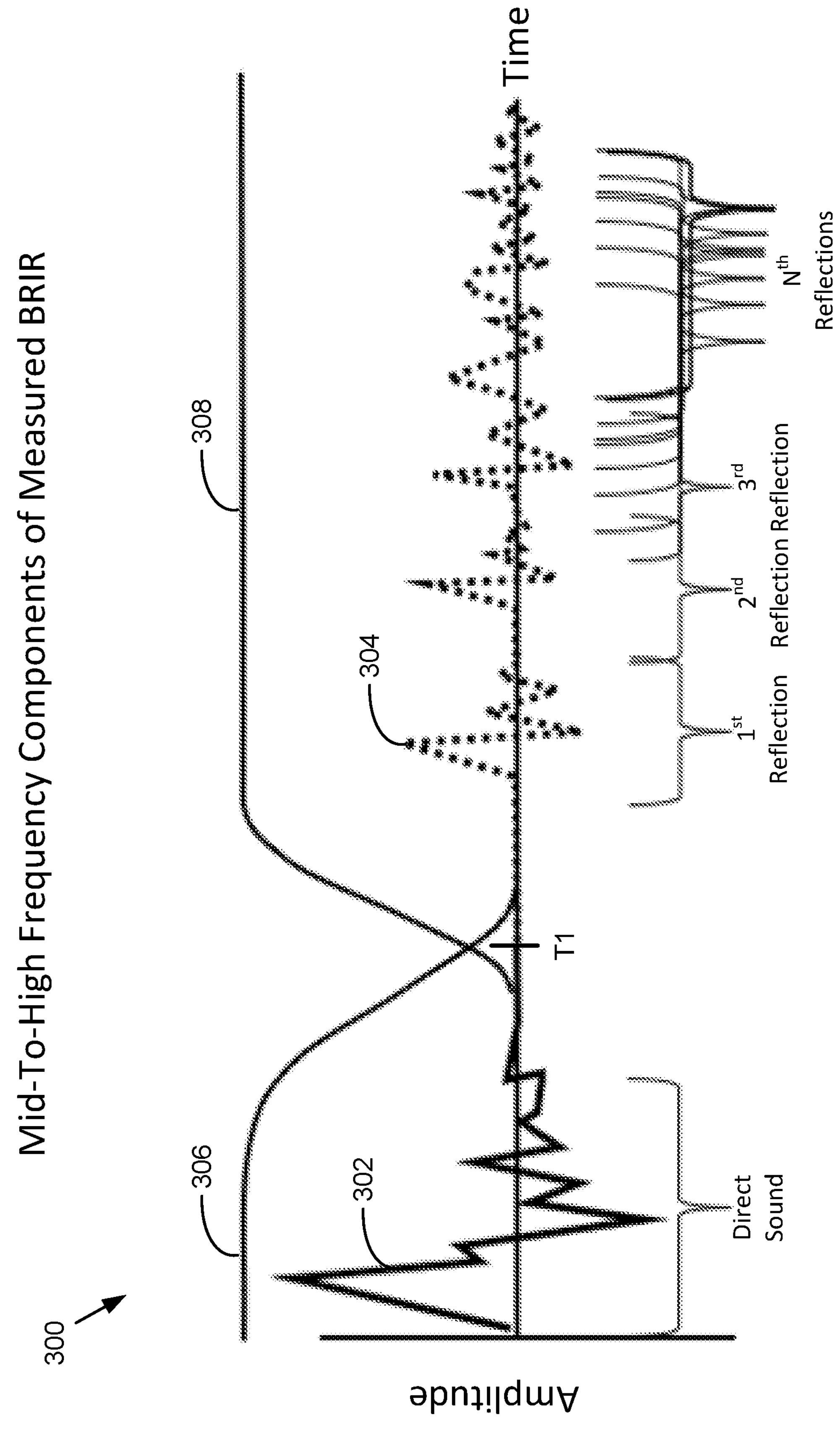
FIG. 3 illustrates the mid-to-high-frequency components of a measured BRIR of an acoustic space, according to one or more aspects of the various embodiments.

FIG. 3 illustrates the mid-to-high-frequency components 300 of a measured BRIR of an acoustic space, according to one or more aspects of the various embodiments. For example, the FIG. 3 illustrates the mid-to-high-frequency components 300 of the BRIR of acoustic space 202 measured by BRIR measurement application 118. The mid-to-high-frequency components 300 of the measured BRIR include the components of the measured BRIR that have frequencies greater than a crossover frequency. In some embodiments, the value of the crossover frequency is determined empirically. In some embodiments, the value of the crossover frequency is determined based on one or more characteristics of acoustic space 202. In one non-limiting example, the crossover frequency is 900 Hz. In other examples, the value of the crossover frequency is less than 900 Hz or greater than 900 Hz. Hereinafter, the mid-to-high-frequency components 300 of the measured BRIR of acoustic space 202 can also be referred to simply as the high-frequency components of the measured BRIR of acoustic space 202.

As shown in FIG. 3, the mid-to-high-frequency components of the measured BRIR include a direct sound portion 302 and a reflected sound portion 304. The direct sound portion 302 includes the portion of sound emitted by loudspeaker 204 that is received directly by omni-directional microphone 206 when BRIR measurement application 118 measures the BRIR of acoustic space 202. That is, the direct sound portion 302 is the portion of sound emitted by loudspeaker 204 that arrives directly at omni-directional microphone 206 without being reflected off one or more surfaces (e.g., walls, floor, ceiling, structures, etc.) of acoustic space 202. The time at which the direct sound portion 302 arrives at omni-directional microphone 206 is indicative of the time at which sound emitted by a source, such as loudspeaker 204, in acoustic space 202 arrives directly at a listener's ears.

In contrast, the reflected sound portion 304 includes the portions of sound emitted by loudspeaker 204 that are reflected off one or more surfaces of acoustic space 202 before arriving at omni-directional microphone 206 when BRIR measurement application 118 measures the BRIR of acoustic space 202. The time at which the reflected sound portion 304 arrives at omni-directional microphone 206 is indicative of the time at which sound emitted by a source, such as loudspeaker 204, that reflects off one or more surfaces in acoustic space 202 arrives at a listener's car drums. The reflected sound portion 304 can be referred to as the "reverberation tail" of the measured BRIR of acoustic space 202. As shown in FIG. 3, the peak amplitude of the direct sound portion 302 is generally greater than the peak amplitudes of the reflected sound portion 304. This occurs because some of the energy of a sound wave is absorbed by a surface of acoustic space 202 when the sound wave is reflected off the surface of acoustic space 202 and because the sound wave attenuates as the sound wave travels a further distance.

As further shown in FIG. 3, the direct sound portion 302 arrives at omni-directional microphone 206 before the reflected sound portion 304 arrives at omni-directional microphone 206. This occurs because the path of a sound wave that reflects off one or more surfaces of acoustic space 202 before arriving at omni-directional microphone 206 is longer than the path of sound that travels directly from the source (e.g., loudspeaker 204) to omni-directional microphone 206. Therefore, when rendering an audio signal with reverberation, virtualized reverberation application 120 can divide the mid-to-high-frequency components 300 of the measured BRIR of acoustic space 202 into the direct sound portion 302 and the reflected sound portion 304 temporally. That is, virtualized reverberation application 120 can divide the mid-to-high-frequency components 300 of the measured BRIR into a first time window 306 and second time window 308 to separate the direct sound portion 302 from the reflected sound portion 304. When compared to other techniques for processing a BRIR of an acoustic space, dividing a measured BRIR of an acoustic space temporally into a first time window and a second time window is computationally inexpensive.

In the illustrated example, the first time window 306 includes the time before time T1 and the second time window 308 includes the time after time T1. The value of time T1 is selected to be a time by which the direct sound portion 302 has already arrived at omni-directional microphone 206 but also a time by which the reflected sound portion 304 has not yet arrived at omni-directional microphone 206. The value of time T1 is dependent on one or more characteristics of acoustic space 202, as the amount of time taken for the direct and/or reflected sound portions 302, 304 to arrive at omni-directional microphone 206 can vary among different acoustic spaces. In some embodiments, virtualized reverberation application 120 determines the value of time T1 automatically by analyzing the mid-to-high-frequency components 300 of the measured BRIR. In some embodiments, the value of time T1 is determined empirically and/or defined manually by a user.

In one non-limiting example, the value of time T1 is 2 ms. In this example, the direct sound portion 302 included in the mid-to-high-frequency components 300 of the measured BRIR arrives at omni-directional microphone 206 within 2 ms of being emitted by loudspeaker 204. Continuing with this example, the reflected sound portion 304 included in the mid-to-high-frequency components 300 of the measured BRIR arrives at omni-directional microphone 206 more than 2 ms after being emitted by loudspeaker 204. In some examples, the value of time T1 is less than 2 ms. In other examples, the value of time T1 is greater than 2 ms.

In the illustrated example of FIG. 3, virtualized reverberation application 120 implements a hard windowing technique to divide the mid-to-high-frequency components 300 of the measured BRIR into a first time window 306 that occurs before time T1 and second time window 308 that occurs after time T1 to separate the direct sound portion 302 from the reflected sound portion 304. When virtualized reverberation application 120 implements the hard windowing technique, in which there is no overlap between the first and second time windows 306, 308, to separate the direct sound portion 302 from the reflected sound portion 304, there are no negative effects that might typically be attributed to abruptly cutting off an impulse response. In some embodiments, virtualized reverberation application 120 implements a soft windowing technique, in which there is some overlap between the first and second time windows 306, 308, to separate the direct sound portion 302 from the reflected sound portion 304.

As will be described in more detail below, dividing the mid-to-high-frequency components 300 of the measured BRIR into first and second time windows 306, 308 allows virtualized reverberation application 120 to render the mid-to-high-frequency components of an audio signal with the direct sound portion 302 using a precise, yet computationally more expensive, processing technique and separately render the mid-to-high-frequency components of an audio signal with reflected sound portion 304 using a less precise, yet computationally more efficient, processing technique. For example, virtualized reverberation application 120 implements the reverberant loudspeaker (RVL) method to discretely render the mid-to-high-frequency components of an audio signal with the direct sound portion 302 included in the mid-to-high-frequency components 300 of the measured BRIR. As another example, virtualized reverberation application 120 implements a low order processing technique in which the mid-to-high-frequency components of an audio signal are encoded and decoded before rendering the mid-to-high-frequency components of the audio signal with the reflected sound portion 304 included in the mid-to-high-frequency components of the measured BRIR.

Figure 4:
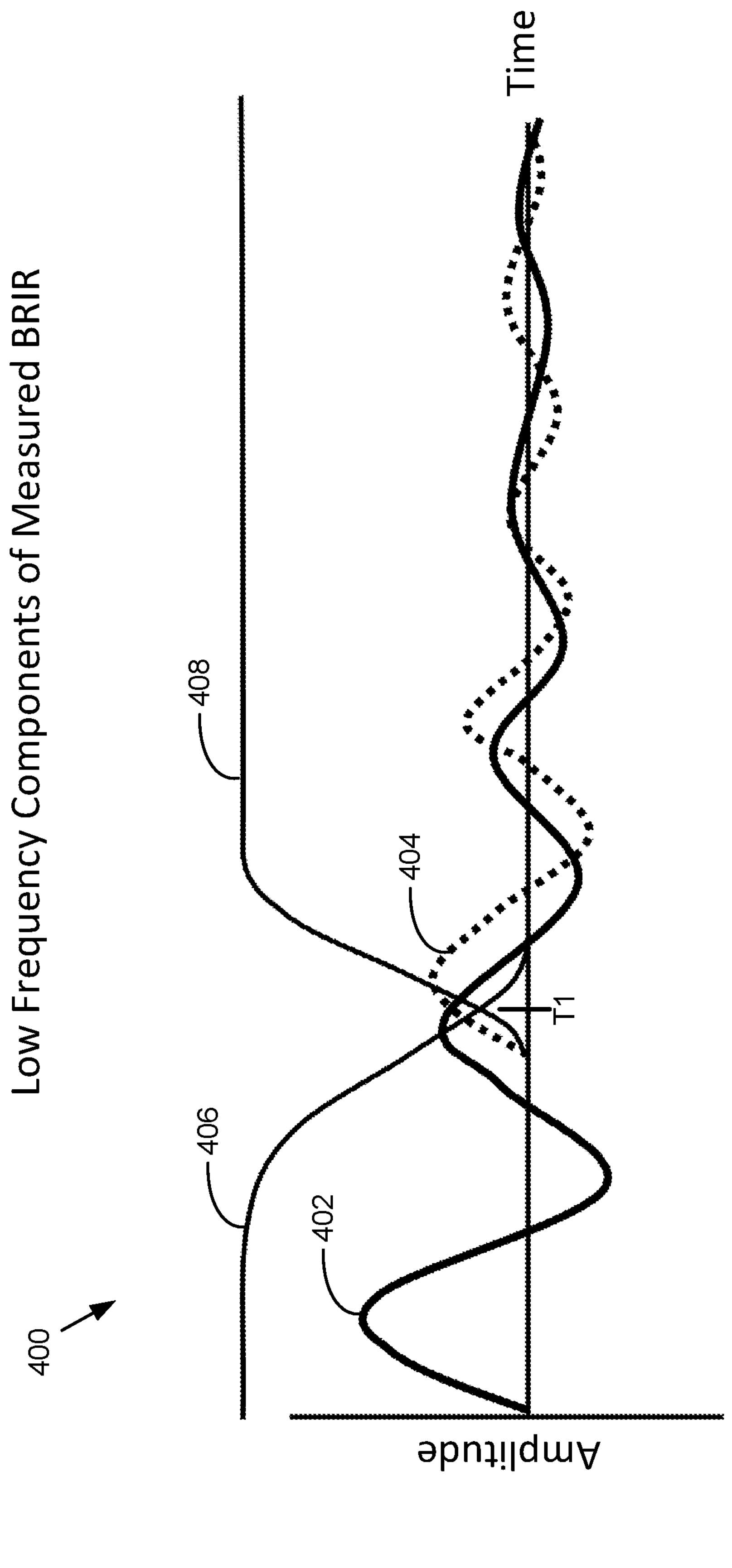
FIG. 4 illustrates the low-frequency components of a measured BRIR of an acoustic space, according to one or more aspects of the various embodiments.

FIG. 4 illustrates the low-frequency components of a measured BRIR of an acoustic space, according to one or more aspects of the various embodiments. For example, the FIG. 4 illustrates the low-frequency components 400 of the BRIR of acoustic space 202 measured by BRIR measurement application 118. The low-frequency components 400 of the measured BRIR include the components of the measured BRIR that have frequencies less than a crossover frequency. In some embodiments, the value of the crossover frequency is determined empirically. In some embodiments, the value of the crossover frequency is determined based on one or more characteristics of acoustic space 202. In one non-limiting example, the crossover frequency is 900 Hz. In other examples, the value of the crossover frequency is less than 900 Hz or greater than 900 Hz.

Similar to the mid-to-high-frequency components 300 of the measured BRIR, the low-frequency components 400 of the measured BRIR also include a direct sound portion 402 and a reflected sound portion 404. However, unlike the mid-to-high-frequency components 300 of the measured BRIR, the direct and reflected sound portion 402, 404 included in the low-frequency components 400 of the measured BRIR cannot easily be separated temporally. For example, as shown in FIG. 4, there is overlap between the times at which direct sound portion 402 arrives at omni-directional microphone 206 and the times at which reflected sound portion 404 arrives at omni-directional microphone 206. This overlap in arrival times can be attributed to the longer wavelengths of low-frequency sound waves when compared to the wavelengths of mid-to-high-frequency sound waves. Thus, even if virtualized reverberation application 120 divides the low-frequency components 400 of the measured BRIR into a first time window 406 that occurs before a time T1 and a second time window 408 that occurs after time T1, such windowing does not separate the direct sound portion 402 from the reflected sound portion 404. In some instances, attempting to separate the direct sound portion 402 from the reflected sound portion 404 when rendering the low-frequency components of an audio signal can introduce undesired windowing effects, which are not an issue at higher frequencies. Accordingly, virtualized reverberation application 120 does not separate the direct sound portion 402 from the reflected sound portion 404 when rendering the low-frequency components of an audio signal.

Figure 5:
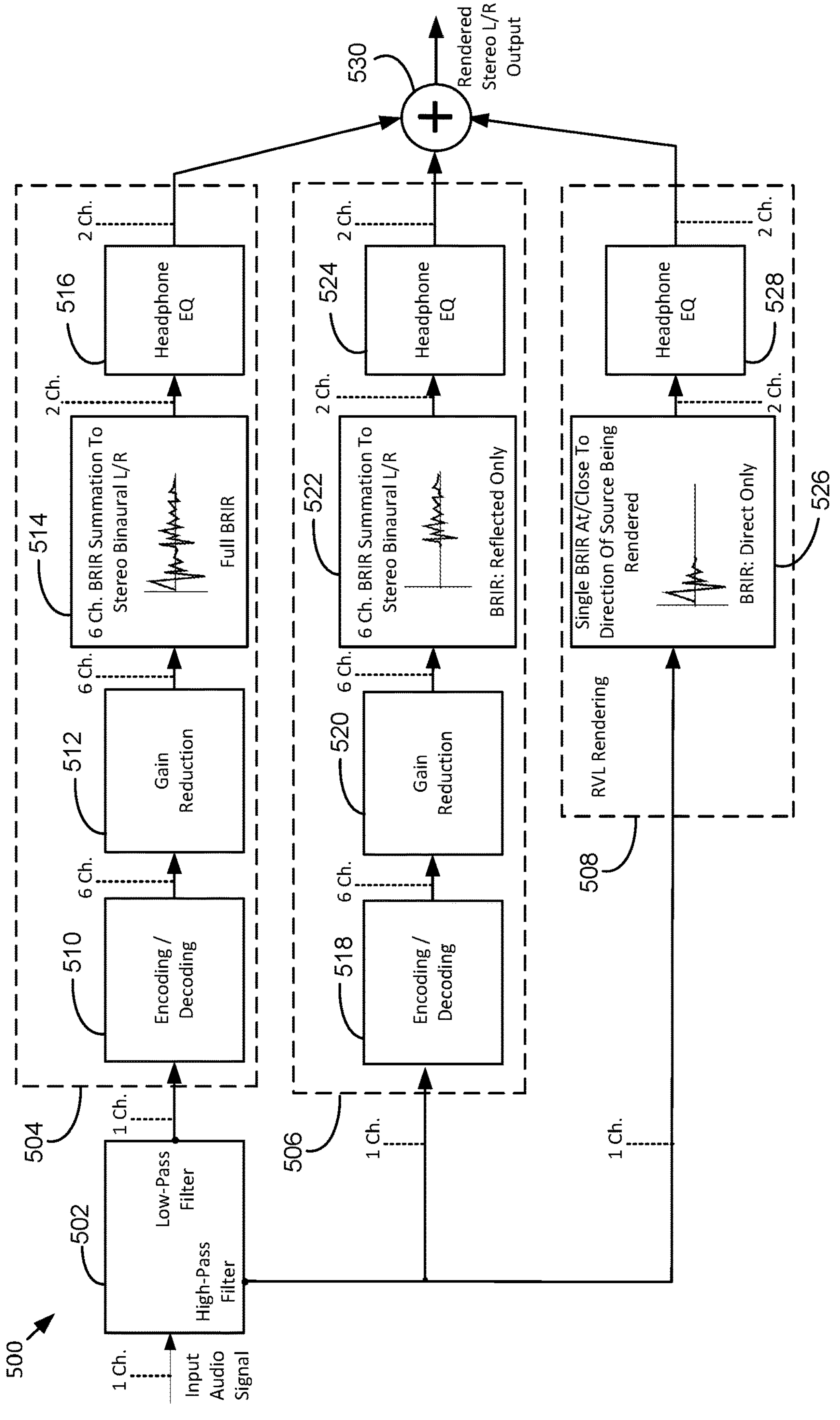
FIG. 5 illustrates a block diagram of a technique for processing an audio signal with a virtualized reverberation algorithm based on measured binaural room impulse responses, according to one or more aspects of the various embodiments.

FIG. 5 illustrates a block diagram 500 of a technique for processing an audio signal with a virtualized reverberation algorithm based on measured binaural room impulse responses, according to one or more aspects of the various embodiments. The technique can be implemented, for example, by virtualized reverberation application 120 executing on processing unit(s) 102 of computing device 100. In some embodiments, virtualized reverberation application 120 implements the processing technique illustrated in FIG. 5 using the BRIR of acoustic space 202 that was measured by BRIR measurement application 118 and stored in system storage 112 as BRIR data 122.

As shown, virtualized reverberation application 120 receives an input audio signal to render with reverberation. In the illustrated example of FIG. 5, the input audio signal is monoaural audio signal that includes a single audio channel. However, in some embodiments, the input audio signal includes more than one channel of audio. For example, the input audio signal can include two or more audio channels.

Virtualized reverberation application 120 applies a filtering process 502 to the input audio signal to separate the low-frequency components of the input audio signal from the mid-to-high-frequency components of the input audio signal. For example, the filtering process 502 includes applying a low-pass filter to the input audio signal to obtain the low-frequency components of the input audio signal. The low-frequency components of the input audio signal include the components of the input audio signal that have frequencies less than a crossover frequency. Filtering process 502 further includes applying a high-pass filter to the input audio signal to obtain the mid-to-high-frequency components of the input audio signal. The mid-to-high-frequency components of the input audio signal include the components of the input audio signal that have frequencies greater than the crossover frequency. As described above, the value of the crossover frequency can be determined empirically and/or based on one or more characteristics of an acoustic space. In one non-limiting example, the crossover frequency is 900 Hz. Hereinafter, the mid-to-high-frequency components of an audio signal, such as the input audio signal, can also simply be referred to as the high-frequency components of an audio signal.

After separating the low-frequency and mid-to-high-frequency components of the input audio signal, virtualized reverberation application 120 uses a first processing technique 504 to add reverberation to the low-frequency components of the input audio signal. Furthermore, virtualized reverberation application 120 uses second and third processing techniques 506, 508 to add reverberation to the mid-to-high-frequency components of the input audio signal. When compared to third processing technique 508, which can be implemented as a discrete RVL method for adding reverberation to the discrete mid-to-high-frequency components of the input audio signal, first and second processing techniques 504, 506 are less precise but more computationally efficient. That is, first and second processing techniques 504, 506 consume less computing resources when implemented by virtualized reverberation application 120 than third processing technique 508.

As shown, first processing technique 504 includes an encoding and decoding process 510 in which virtualized reverberation application 120 encodes low-frequency components of the single audio channel of the input audio signal into a plurality of encoded channels of low-frequency audio. While implementing encoding and decoding process 510, virtualized reverberation application 120 further decodes the plurality of encoded channels of low-frequency audio into a plurality of decoded channels of low-frequency audio. In some instances, the plurality of decoded channels of low-frequency audio correspond to the cardinal directions (e.g., top, bottom, left, right, front, back) from which sound arrives at the cars of a listener. Hereinafter, the decoded channels of low-frequency audio output by encoding and decoding process 510 can be referred to as converted channels of low-frequency audio and/or converted low-frequency audio channels.

In the illustrated example, virtualized reverberation application 120 uses a low-order (e.g., first order) Ambisonics encoder-decoder to encode the single audio channel of the input audio signal into four low-frequency Ambisonics-encoded audio channels (e.g., Ambisonics B format) and decode the four low-frequency Ambisonics-encoded audio channels into six low-frequency audio channels. Each of the six low-frequency decoded, or converted, audio channels corresponds to a respective direction (e.g., top, bottom, left, right, front, back) from which sound arrives at the cars of a listener. Persons skilled in the art will understand that, in some embodiments, virtualized reverberation application 120 uses other types of low-order encoder-decoders to implement encoding and decoding process 510. Moreover, persons skilled in the art will understand that in some embodiments, encoding and decoding process 510 encodes and decodes (e.g., converts) the single audio channel of the input audio signal into fewer than or more than six channels of low-frequency audio.

First processing technique 504 further includes a gain reduction process 512 in which virtualized reverberation application 120 reduces the gain of the converted channels of low-frequency audio. In the illustrated example of FIG. 5, gain reduction process 512 reduces the gain of the six low-frequency converted audio channels. Virtualized reverberation application 120 applies gain reduction process 512 to the plurality of converted low-frequency audio channels to prevent rendering an audio signal with reverberation in which the mid-to-high-frequency components of the rendered audio signal are overpowered by the low frequency components. In one non-limiting example, gain reduction process 512 reduces the respective gains of the plurality of converted low-frequency audio channels to values between −8 dB and −15B. However, persons skilled in the art will understand that in some embodiments, gain reduction process 512 reduces the respective gains of the plurality of converted low-frequency audio channels to other values.

Virtualized reverberation application 120 then applies a low-frequency convolution process 514 to the plurality of converted low-frequency audio channels to generate left and right low-frequency audio channels that include reverberation effects. Low-frequency convolution process 514 includes convolving the plurality of converted low-frequency audio channels with low-frequency components of a measured BRIR of an acoustic space. As described above, because it is difficult to divide the low-frequency components of a measured BRIR into direct and reflected sound portions in a computationally efficient manner (e.g., temporally), low-frequency convolution process 514 convolves the plurality of converted low-frequency audio channels with both the direct and reflected sound portions included in the low-frequency components of the measured BRIR. For example, when implementing low-frequency convolution process 514, virtualized reverberation application 120 convolves the plurality of converted low-frequency audio channels with the direct and reflected sound portions 402, 404 included in the low-frequency components 400 of the measured BRIR of acoustic space 202.

Figure 6:
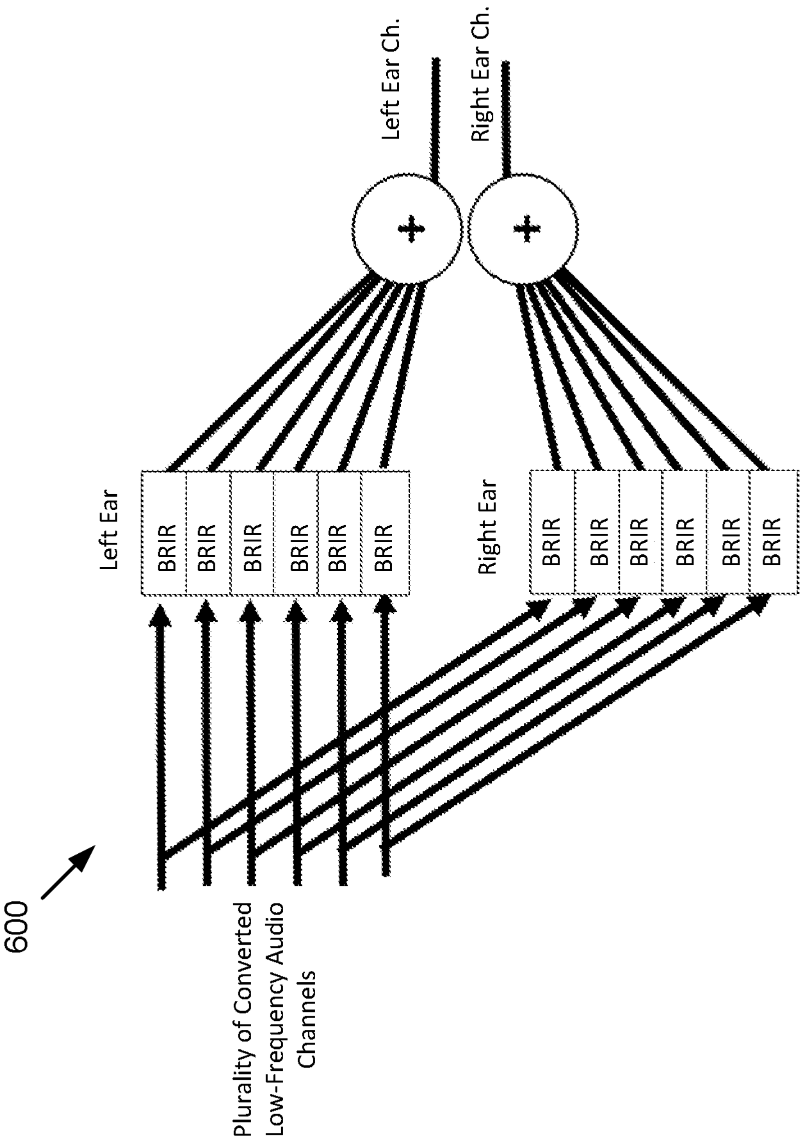
FIG. 6 illustrates a block diagram of a convolution process included in the technique for processing audio illustrated in FIG. 5, according to one or more aspects of the various embodiments.

FIG. 6 illustrates a block diagram 600 of a convolution process that can be used to implement low-frequency convolution process 514. With respect to FIG. 6, during low-frequency convolution process 514, virtualized reverberation application 120 convolves each of the plurality of converted low-frequency audio channels with respective low-frequency left car components of the measured BRIR. When a respective converted low-frequency audio channel is convolved with a corresponding low-frequency left ear component of the measured BRIR, the result is a rendered low-frequency audio channel that includes reverberation effects. After convolving each converted low-frequency audio channel with a corresponding low-frequency left ear component of the measured BRIR, virtualized reverberation application 120 sums the resultant rendered low-frequency audio channels that into a single rendered low-frequency left ear audio channel that includes reverberation effects. In some embodiments, each of the low-frequency left ear components of the measured BRIR corresponds to a respective direction (e.g., top, bottom, left, right, front, back) from which sound arrives at the left car of a listener.

Similarly, during low-frequency convolution process 514, virtualized reverberation application 120 convolves each of the plurality of converted low-frequency audio channels with respective low-frequency right car components of the measured BRIR. When a respective converted low-frequency audio channel is convolved with a corresponding low-frequency right car component of the measured BRIR, the result is a rendered low-frequency audio channel that includes reverberation effects. After convolving each converted low-frequency audio channel with a corresponding low-frequency right car component of the measured BRIR, virtualized reverberation application 120 sums the resultant rendered low-frequency audio channels into a single rendered low-frequency right car audio channel that includes reverberation effects. In some embodiments, each of the low-frequency right car components of the measured BRIR corresponds to a respective direction (e.g., top, bottom, left, right, front, back) from which sound arrives at the right car of a listener.

As described above, after virtualized reverberation application 120 applies low-frequency convolution process 514 to the plurality of converted low-frequency audio channels, the result is a rendered low-frequency left car audio channel and a rendered low-frequency right car audio channel. First processing technique 504 further includes a headphone equalization process 516 in which virtualized reverberation application 120 equalizes the rendered low-frequency left ear audio channel and the rendered low-frequency right car audio channel. Headphone equalization process 516 implements one or more known equalization techniques to adjust the respective volume levels of frequency components included in the rendered low-frequency left and right car audio channels.

Referring back to FIG. 5, virtualized reverberation application 120 also uses second and third processing techniques 506, 508 to add reverberation to the mid-to-high-frequency components of the input audio signal. As shown in FIG. 5, second processing technique 506 includes an encoding and decoding process 518 in which virtualized reverberation application 120 encodes the mid-to-high-frequency components of the single audio channel of the input audio signal into a plurality of encoded channels of mid-to-high-frequency audio. While implementing encoding and decoding process 518, virtualized reverberation application 120 further decodes the plurality of encoded channels of mid-to-high-frequency audio into a plurality of decoded channels of mid-to-high-frequency audio. In some instances, the plurality of decoded channels of mid-to-high-frequency audio correspond to the cardinal directions (e.g., top, bottom, left, right, front, back) from which sound arrives at the cars of a listener. Hereinafter, the decoded channels of mid-to-high-frequency audio output by encoding and decoding process 510 can be referred to as converted channels of mid-to-high-frequency audio and/or converted mid-to-high-frequency audio channels.

In the illustrated example, virtualized reverberation application 120 uses a low-order (e.g., first order) Ambisonics encoder-decoder to encode the single audio channel of the input audio signal into four mid-to-high-frequency Ambisonics-encoded audio channels (e.g., Ambisonics B format) and decode the four mid-to-high-frequency Ambisonics-encoded audio channels into six mid-to-high-frequency audio channels. Each of the six mid-to-high-frequency decoded, or converted, audio channels corresponds to a respective direction (e.g., top, bottom, left, right, front, back) from which sound arrives at the cars of a listener. However, persons skilled in the art will understand that, in some embodiments, virtualized reverberation application 120 uses other types of low-order encoder-decoders to implement encoding and decoding process 518. Moreover, persons skilled in the art will understand that in some embodiments, encoding and decoding process 518 encodes and decodes (e.g., converts) the single audio channel of the input audio signal into fewer than or more than six channels of mid-to-high-frequency audio.

Second processing technique 508 further includes a gain reduction process 520 in which virtualized reverberation application 120 reduces the gain of the plurality of converted channels of mid-to-high-frequency audio. In the illustrated example of FIG. 5, gain reduction process 520 reduces the gain of the six mid-to-high-frequency converted audio channels. Virtualized reverberation application 120 applies gain reduction process 520 to the plurality of converted low-frequency audio channels to prevent rendering an audio signal with reverberation in which the mid-to-high-frequency components rendered with direct sound portions of a measured BRIR are overpowered by mid-to-high-frequency components rendered with reflected sound portions of a measured BRIR. In one non-limiting example, gain reduction process 520 reduces the respective gains of the plurality of converted mid-to-high-frequency audio channels to values between-8 dB and −15B. However, persons skilled in the art will understand that in some embodiments, gain reduction process 520 reduces the respective gains of the plurality of converted mid-to-high-frequency audio channels to other values.

Virtualized reverberation application 120 then applies a reflected convolution process 522 to the plurality of converted mid-to-high-frequency audio channels to generate left and right audio channels that include reverberation effects of reflected sound arriving at a listener's ears. Reflected convolution process 522 includes convolving the plurality of converted mid-to-high-frequency audio channels with only the reflected sound portions included in the mid-to-high-frequency components of a measured BRIR of an acoustic space. For example, when implementing reflected convolution process 522, virtualized reverberation application 120 convolves the plurality of converted mid-to-high-frequency audio channels with only the reflected sound portion 304 included in the mid-to-high-frequency components 300 of the measured BRIR of acoustic space 202. As described above with respect to FIG. 3, the reflected sound portion 304 included in the mid-to-high-frequency components 300 of a measured BRIR can be separated from the direct sound portion 302 included in the mid-to-high-frequency components 300 temporally.

The block diagram 600 of the convolution process illustrated in FIG. 6 can also be used to implement reflected convolution process 522. With respect to FIG. 6, during reflected convolution process 522, virtualized reverberation application 120 convolves each of the plurality of converted mid-to-high-frequency audio channels with respective reflected sound portions included in the mid-to-high-frequency left ear components of the measured BRIR. When a respective converted mid-to-high-frequency audio channel is convolved with a corresponding reflected sound portion included in the mid-to-high-frequency left car component of the measured BRIR, the result is a rendered mid-to-high-frequency audio channel that includes reverberation effects associated with the reflected sound portion of a measured BRIR. After convolving each converted mid-to-high-frequency audio channel with a corresponding reflected sound portion included in the mid-to-high-frequency left car component of the measured BRIR, virtualized reverberation application 120 sums the resultant rendered mid-to-high-frequency audio channels into a single rendered mid-to-high-frequency left car audio channel that includes reverberation effects associated with the reflected sound portion of the measured BRIR. In some embodiments, each of the reflected sound portions included in the mid-to-high-frequency left ear components of the measured BRIR corresponds to a respective direction (e.g., top, bottom, left, right, front, back) from which reflected sound arrives at the left ear of a listener.

Similarly, during reflected convolution process 522, virtualized reverberation application 120 convolves each of the plurality of converted mid-to-high-frequency audio channels with respective reflected sound portions included in the mid-to-high-frequency right car components of the measured BRIR. When a respective converted mid-to-high-frequency audio channel is convolved with a corresponding reflected sound portion included in the mid-to-high-frequency right car component of the measured BRIR, the result is a rendered mid-to-high-frequency audio channel that includes reverberation effects associated with the reflected sound portion of a measured BRIR. After convolving each converted mid-to-high-frequency audio channel with a corresponding reflected sound portion included in the mid-to-high-frequency right car component of the measured BRIR, virtualized reverberation application 120 sums the resultant rendered mid-to-high-frequency audio channels into a single rendered mid-to-high-frequency right car audio channel that includes reverberation effects associated with the reflected sound portion of the measured BRIR. In some embodiments, each of the reflected sound portions included in the mid-to-high-frequency right car components of the measured BRIR corresponds to a respective direction (e.g., top, bottom, left, right, front, back) from which reflected sound arrives at the right car of a listener.

As described above, after virtualized reverberation application 120 applies reflected convolution process 522 to the plurality of converted mid-to-high-frequency audio channels, the result is a rendered mid-to-high-frequency left car audio channel that includes reverberation effects associated with the reflected sound portion of a measured BRIR and a rendered mid-to-high-frequency right car audio channel that includes reverberation effects associated with the reflected sound portion of a measured BRIR. Second processing technique 506 further includes a headphone equalization process 524 in which virtualized reverberation application 120 equalizes the above-described rendered mid-to-high-frequency left and right car audio channels that include reverberation effects associated with the reflected sound portion of a measured BRIR. Headphone equalization process 524, which is similar to headphone equalization process 516, implements one or more known equalization techniques to adjust the respective volume levels of frequency components included in the rendered mid-to-high-frequency left and right car audio channels.

With respect to third processing technique 508, virtualized reverberation application 120 does not encode and decode, or convert, the mid-to-high-frequency components of the single audio channel included in the input audio signal before implementing direct convolution process 526. Rather, virtualized reverberation application 120 renders the discrete mid-to-high-frequency components of the single audio channel included in input audio signal with reverberation using a high-resolution, direct convolution process 526. In the illustrated example of FIG. 5, third processing technique 508 is implemented using the RVL method for adding reverberation to an audio signal.

When applying direct convolution process 526 to the discrete mid-to-high-frequency components of single audio channel included in the input audio signal, virtualized reverberation application 120 convolves the discrete mid-to-high-frequency audio channel with only the direct sound portion included in the mid-to-high-frequency components of a measured BRIR of an acoustic space. For example, when implementing direct convolution process 526, virtualized reverberation application 120 convolves the discrete mid-to-high-frequency audio channel with the only the direct sound portion 302 included in the mid-to-high-frequency components 300 of the measured BRIR of acoustic space 202. As described above with respect to FIG. 3, the direct sound portion 302 included in the mid-to-high-frequency components 300 of a measured BRIR can be separated from the reflected sound portion 304 included in the mid-to-high-frequency components 300 temporally.

In one example, when implementing direct convolution process 526, virtualized reverberation application 120 convolves the discrete mid-to-high-frequency audio channel with the direct sound portion included in the mid-to-high-frequency left ear components of the measured BRIR. The direct sound portion included in the mid-to-high-frequency left ear components of the measured BRIR corresponds to the direction at which sound emitted by a source arrives directly at the left ear of a listener. Similarly, when implementing direct convolution process 526, virtualized reverberation application 120 also convolves the discrete mid-to-high-frequency audio channel with the direct sound portion included in the mid-to-high-frequency right car components of the measured BRIR. The direct sound portion included in the mid-to-high-frequency right car components of the measured BRIR corresponds to the direction at which sound emitted by a source arrives directly at the right car of a listener.

The result of direct convolution process 526 is a rendered mid-to-high-frequency left car audio channel that includes reverberation effects associated with the direct sound portion of a measured BRIR and a rendered mid-to-high-frequency right car audio channel that includes reverberation effects associated with the direct sound portion of a measured BRIR. Using the high-resolution, direct convolution process 525 to convolve the discrete mid-to-high-frequency audio channel with the direct sound portion included in the mid-to-high-frequency components of the measured BRIR helps offset potential performance losses attributed to using low-order encoding and decoding in the second processing technique 506. As described above, in some examples, a low-order Ambisonics encoder-decoder is used to implement the low-order encoding and decoding in the second processing technique 506.

Third processing technique 508 further includes a headphone equalization process 528 in which virtualized reverberation application 120 equalizes the rendered mid-to-high-frequency left and right car audio channels that include reverberation effects associated with the direct sound portion of a measured BRIR. Headphone equalization process 528, which is similar to headphone equalization processes 516 and 524, implements one or more known equalization techniques to adjust the respective volume levels of frequency components included in the rendered mid-to-high-frequency left and right car audio channels.

Virtualized reverberation application 120 then implements a summation process 530 to combine the rendered left car audio channels generated using first, second, third processing techniques 504, 506, and 508 and to combine the rendered right car audio channels generated using first, second, third processing techniques 504, 506, and 508 into a rendered stereo audio signal that includes a left audio channel and a right audio channel. For example, when implementing summation process 530, virtualized reverberation application 120 sums the rendered low-frequency left car audio channel generated using first processing technique 504, the rendered mid-to-high-frequency left car audio channel generated using second processing technique 506, and the rendered mid-to-high-frequency left ear audio channel generated using third processing technique 508 to obtain a single left car audio channel that includes reverberation effects. Similarly, when implementing summation process 530, virtualized reverberation application 120 sums the rendered low-frequency right car audio channel generated using first processing technique 504, the rendered mid-to-high-frequency right car audio channel generated using second processing technique 506, and the rendered mid-to-high-frequency right car audio channel generated using third processing technique 508 to obtain a single right car audio channel that includes reverberation effects. Virtualized reverberation application 120 then outputs a rendered stereo audio signal that includes the single left car audio channel and the single right car audio channel for playback by headphones or other loudspeaker arrangement capable of playing back stereo audio.

Figure 7:
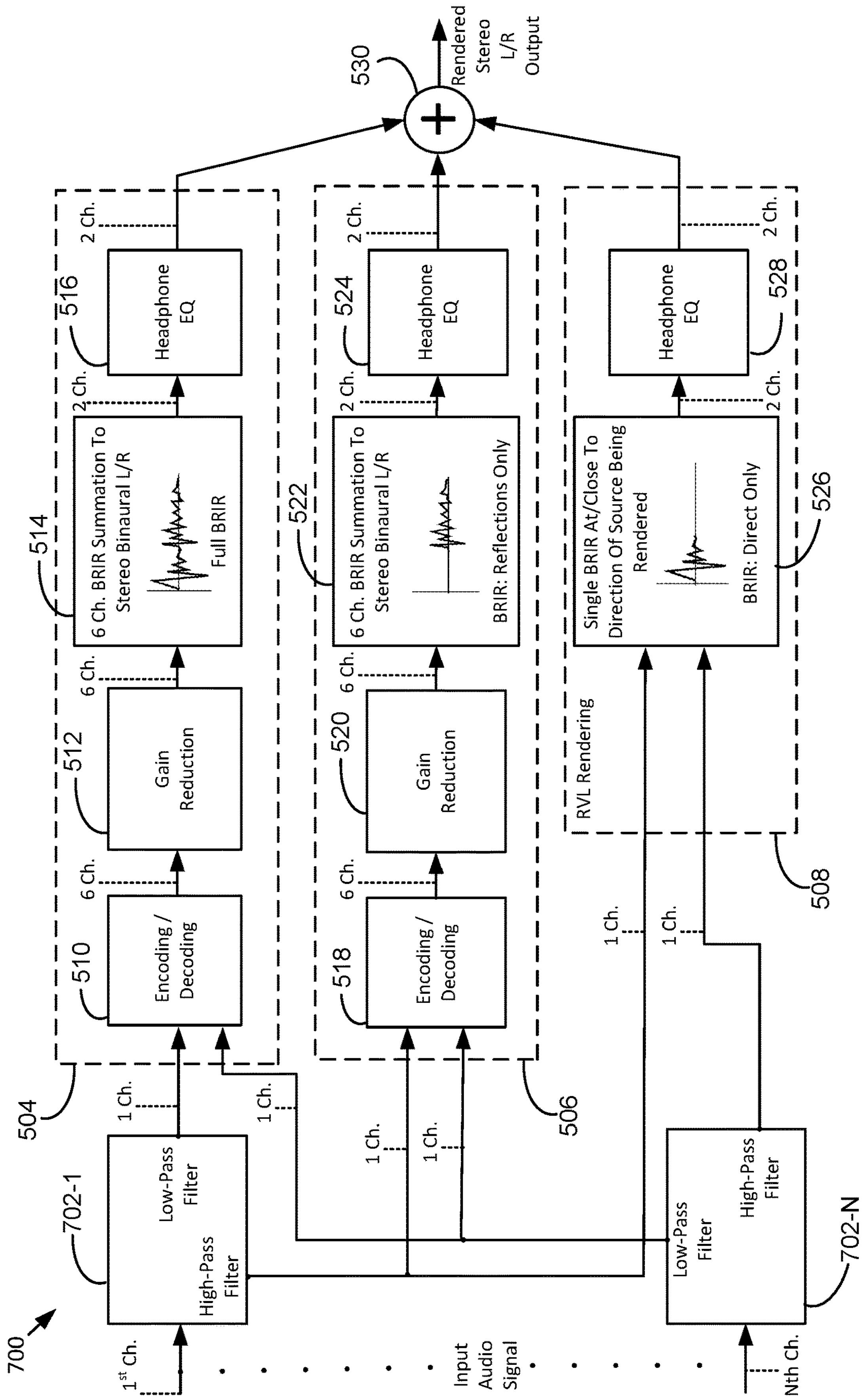
FIG. 7 illustrates a block diagram of a technique for processing an audio signal with a virtualized reverberation algorithm based on measured binaural room impulse responses, according to one or more aspects of the various embodiments.

In the illustrated example of FIG. 5, the input audio signal is a monaural audio signal that includes a single audio channel. However, in some instances, the input audio signal includes more than one channel of audio. For example, the input audio signal can include two or more audio channels. FIG. 7 illustrates a block diagram 700 of a technique for processing an audio signal of N channels with a virtualized reverberation algorithm based on measured binaural room impulse responses, according to one or more aspects of the various embodiments.

As shown, the processing technique illustrated in FIG. 7 is very similar in operation to the processing technique illustrated in FIG. 5. However, whereas the processing technique illustrated in FIG. 5 includes a single filtering process 502 for separating the low-frequency components of the mono input audio signal from the mid-to-high-frequency components of the mono input audio signal, the processing technique illustrated in FIG. 7 includes n filtering processes 702-1-702-N for separating the low-frequency components of the N audio channels included in the input audio signal from the mid-to-high-frequency components of the N audio channels included in the input audio signal.

For example, virtualized reverberation application 120 implements first filtering process 702-1 to separate the low-frequency components of a first audio channel included in the input audio signal from the mid-to-high-frequency components of the first audio channel included the input audio signal. For example, the first filtering process 702-1 includes applying a low-pass filter to the first audio channel included in the input audio signal to obtain the low-frequency components of the first audio channel. The low-frequency components of the first audio channel included in the input audio signal include the components of the first audio channel that have frequencies less than a crossover frequency. First filtering process 702-1 further includes applying a high-pass filter to the first audio channel included in the input audio signal to obtain the mid-to-high-frequency components of the first audio channel. The mid-to-high-frequency components of the first audio channel included in the input audio signal include the components of the first audio channel that have frequencies greater than the crossover frequency.

Similarly, virtualized reverberation application 120 further applies respective filtering processes 702 to each additional audio channel included in the input audio signal to separate the low-frequency components of the additional audio channels included in the input audio signal from the mid-to-high-frequency components of the additional audio channels included in the input audio signal. For example, virtualized reverberation application 120 implements Nth filtering process 702-N to separate the low-frequency components of the Nth audio channel included in the input audio signal from the mid-to-high-frequency components of the Nth audio channel included the input audio signal.

After separating the low-frequency components of the N audio channels included in the input audio signal from the mid-to-high-frequency components of the N audio channels included in the input audio signal, virtualized reverberation application 120 uses the first processing technique 504, as described above, to add reverberation to the low-frequency components of the N audio channels included the input audio signal. Furthermore, virtualized reverberation application 120 uses second and third processing techniques 506, 508, as described above, to add reverberation to the mid-to-high-frequency components of the N audio channels included in the input audio signal.

Figure 8:
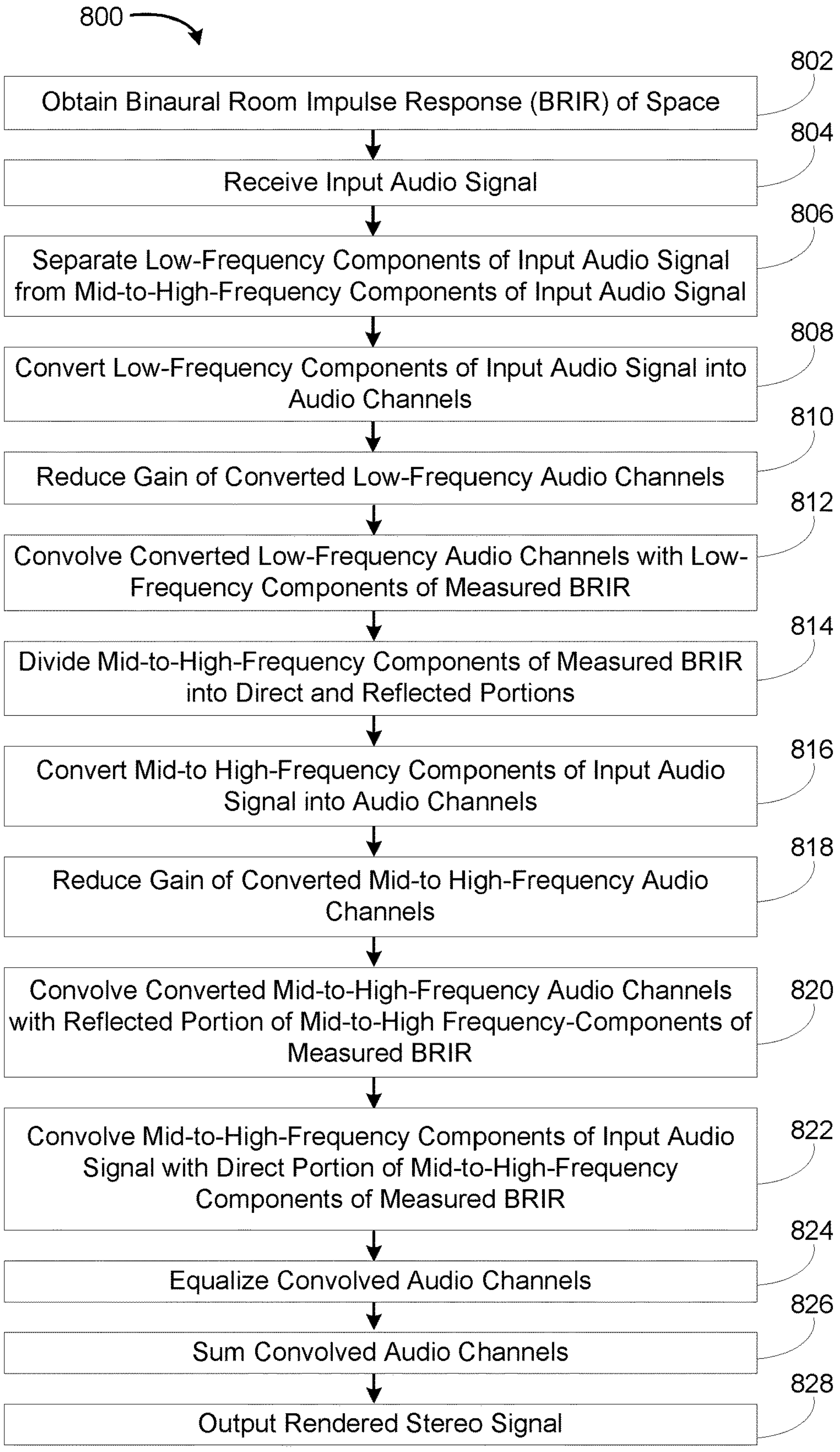
FIG. 8 is a flow chart of method steps for processing an audio signal, according to one or more aspects of the various embodiments.

FIG. 8 is a flow chart of method steps for processing an audio signal, according to one or more aspects of the various embodiments. Although the method steps are described with respect to the systems and examples of FIGS. 1-7, persons skilled in the art will understand that any system configured to perform the method steps, in any order, falls within the scope of the various embodiments.

As shown, a method 800 begins at step 802, where virtualized reverberation application 120 obtains a measured BRIR of an acoustic space, such as the measured BRIR of acoustic space 202. In some examples, BRIR measurement application 118 obtains the BRIR by measuring the BRIR of acoustic space 202 and storing the measured BRIR of acoustic space 202 as BRIR data 122 in system storage 112. In some examples, virtualized reverberation application 120 receives the measured BRIR of acoustic space 202 directly from BRIR measurement application 118. In such examples, BRIR measurement application 118 measures the BRIR of acoustic space 202 and provides the measured BRIR of acoustic space 202 to virtualized reverberation application 120. In some examples, BRIR measurement application 118 uses one or more known techniques, such as the MLS technique, the IRS technique, the time-stretched pulses technique, or the logarithmic sinesweep technique, to measure BRIR of acoustic space 202.

At step 804, virtualized reverberation application 120 receives an input audio signal. In some examples, the input audio signal includes a single audio channel. In other examples, the input audio signal includes multiple audio channels. In one example, the input audio signal is a stereo audio signal that includes a left audio channel and a right audio channel. In other examples, the input audio signal includes 5.1.2 audio channels, 7.1.2 audio channels, or some other amount of audio channels.

At step 806, virtualized reverberation application 120 separates the low-frequency components of the input audio signal from the mid-to-high-frequency components of the input audio signal. In some examples, virtualized reverberation application 120 applies a low-pass filter to the input audio signal to obtain low-frequency components of the input audio signal that have frequencies less than a crossover frequency. In such examples, virtualized reverberation application 120 further applies a high-pass filter to the input audio signal to obtain mid-to-high-frequency components of the input audio signal that have frequencies greater than the crossover frequency. In one non-limiting example, the crossover frequency is 900 Hz. In other examples, the crossover frequency can be greater than or less than 900 Hz.

At step 808, virtualized reverberation application 120 converts the low-frequency components of the input audio signal into a plurality of converted low-frequency audio channels. For example, virtualized reverberation application 120 uses encoding and decoding process 510 to convert (e.g., encode and decode) the low-frequency components of the input audio signal into a plurality of converted low-frequency audio channels. In one non-limiting example, virtualized reverberation application 120 uses a low-order Ambisonics encoder-decoder to encode the low-frequency components of the input audio signal into four low-frequency Ambisonics-encoded audio channels and decode the four low-frequency Ambisonics-encoded audio channels into a plurality of low-frequency decoded audio channels. In other examples, virtualized reverberation application 120 can convert the low-frequency components of the input audio signal using a different type of low-order encoder-decoder.

At step 810, virtualized reverberation application 120 reduces the respective gains of the plurality of converted low-frequency audio channels. In one non-limiting example, virtualized reverberation application 120 reduces the respective gains of the plurality of converted low-frequency audio channels to a value between −8 dB and −15B. In other examples, virtualized reverberation application 120 can reduce the respective gains of the plurality of converted low-frequency audio channels to have different gain values.

At step 812, virtualized reverberation application 120 convolves the plurality of converted low-frequency audio channels with low-frequency components 400 of the measured BRIR of acoustic space 202. For example, virtualized reverberation application 120 uses low-frequency convolution process 514 to convolve the plurality of converted low-frequency audio channels with low-frequency components 400 of the measured BRIR of acoustic space 202. The result of convolving the plurality of converted low-frequency audio channels with the low-frequency components 400 of the measured BRIR is a rendered low-frequency left audio channel that includes reverberation effects and a rendered low-frequency right audio channel that includes reverberation effects.

At step 814, virtualized reverberation application 120 divides the mid-to-high-frequency components 300 of the measured BRIR of acoustic space 202 into a direct sound portion 302 and a reflected sound portion 304. In some examples, virtualized reverberation application 120 divides the mid-to-high-frequency components 300 of the measured BRIR of acoustic space 202 into a direct sound portion 302 and a reflected sound portion 304 temporally. In such examples, virtualized reverberation application 120 can divide the mid-to-high-frequency components 300 of the measured BRIR into a first time window 306 that occurs before a time T1 and second time window 308 that occurs after the time T1 to separate the direct sound portion 302 from the reflected sound portion 304. In one non-limiting example, the value of time T1 is 2 ms. In other examples, the value of time T1 can be less than or greater than 2 ms.

At step 816, virtualized reverberation application 120 converts the mid-to-high-frequency components of the input audio signal into a plurality of converted mid-to-high-frequency audio channels. For example, virtualized reverberation application 120 uses encoding and decoding process 518 to convert (e.g., encode and decode) the mid-to-high-frequency components of the input audio signal into a plurality of converted mid-to-high-frequency audio channels. In one non-limiting example, virtualized reverberation application 120 uses a low-order Ambisonics encoder-decoder to encode the mid-to-high-frequency components of the input audio signal into four mid-to-high-frequency Ambisonics-encoded audio channels and decode the four mid-to-high-frequency Ambisonics-encoded audio channels into a plurality of mid-to-high-frequency decoded audio channels. In other examples, virtualized reverberation application 120 can convert the mid-to-high-frequency components of the input audio signal using a different type of low-order encoder-decoder.

At step 818, virtualized reverberation application 120 reduces the respective gains of the plurality of converted mid-to-high-frequency audio channels. In one non-limiting example, virtualized reverberation application 120 reduces the respective gains of the plurality of converted mid-to-high-frequency audio channels to values between −8 dB and −15B. In other examples, virtualized reverberation application 120 can reduce the respective gains of the plurality of converted mid-to-high-frequency audio channels to have different gain values.

At step 820, virtualized reverberation application 120 convolves the plurality of converted mid-to-high-frequency audio channels with the reflected sound portion 304 included in the mid-to-high-frequency components 300 of the measured BRIR of acoustic space 202. For example, virtualized reverberation application 120 uses reflected convolution process 522 to convolve the plurality of converted mid-to-high-frequency audio channels with the reflected sound portion 304 included in the mid-to-high-frequency components 300 of the measured BRIR of acoustic space 202. The result of convolving the plurality of converted mid-to-high-frequency audio channels with the reflected sound portion 304 included in the mid-to-high-frequency components 300 of the measured BRIR is a rendered mid-to-high-frequency left audio channel that includes reverberation effects associated with the reflected sound portion of a measured BRIR and a rendered mid-to-high-frequency right car audio channel that includes reverberation effects associated with the reflected sound portion of a measured BRIR.

At step 822, virtualized reverberation application 120 convolves the discrete mid-to-high-frequency components of the input audio signal with the direct sound portion 302 included in the mid-to-high-frequency components 300 of the measured BRIR of acoustic space 202. That is, virtualized reverberation application 120 does not convert the mid-to-high-frequency components of the input audio signal before convolving the mid-to-high-frequency components of the input audio signal with the direct sound portion 302 included in the mid-to-high-frequency components 300 of the measured BRIR of acoustic space 202. For example, virtualized reverberation application 120 uses direct convolution process 526 to convolve the discrete mid-to-high-frequency components of the input audio signal with the direct sound portion 302 included in the mid-to-high-frequency components 300 of the measured BRIR of acoustic space 202. The result of convolving the discrete mid-to-high-frequency audio channels with the direct sound portion 302 included in the mid-to-high-frequency components 300 of the measured BRIR is a rendered mid-to-high-frequency left audio channel that includes reverberation effects associated with the direct sound portion of a measured BRIR and a rendered mid-to-high-frequency right audio channel that includes reverberation effects associated with the direct sound portion of a measured BRIR.

At step 824, virtualized reverberation application 120 equalizes the rendered left and right audio channels. For example, virtualized reverberation application 120 applies headphone equalization process 516 to the rendered low-frequency left and right audio channels that include reverberation effects. As another example, virtualized reverberation application 120 applies headphone equalization process 524 to the rendered mid-to-high-frequency left and right audio channels that include reverberation effects associated with the reflected sound portion of a measured BRIR. As another example, virtualized reverberation application 120 applies headphone equalization process 528 to the rendered mid-to-high-frequency left and right audio channels that include reverberation effects associated with the direct sound portion of a measured BRIR.

At step 826, virtualized reverberation application 120 sums, or combines, the rendered left audio channels and sums, or combines, the rendered right audio channels. For example, virtualized reverberation application 120 implements summation process 530 to combine the rendered low-frequency left audio channel that includes reverberation effects, the rendered mid-to-high-frequency left audio channel that includes reverberation effects associated with the reflected sound portion of a measured BRIR, and the rendered mid-to-high-frequency left audio channel that includes reverberation effects associated with the direct sound portion of a measured BRIR into a single rendered left audio channel that includes reverberation effects. Similarly, virtualized reverberation application 120 implements summation process 530 to combine the rendered low-frequency right audio channel that includes reverberation effects, the rendered mid-to-high-frequency right audio channel that includes reverberation effects associated with the reflected sound portion of a measured BRIR, and the rendered mid-to-high-frequency right audio channel that includes reverberation effects associated with the direct sound portion of a measured BRIR into a single rendered right audio channel that includes reverberation effects. At step 828, virtualized reverberation application 120 outputs a rendered stereo signal that includes the single rendered left audio channel that includes reverberation effects and the single rendered right audio channel that includes reverberation effects.

In sum, a computing device renders an audio signal with reverberation based on a measured binaural room impulse response (BRIR) of an acoustic space to add reverberation effects of the acoustic space for playback using headphones. With the disclosed techniques, the computing device adds reverberation to the audio signal using three separate processing techniques. Further, with the disclosed techniques, the computing device separates an audio signal into low-frequency components and high-frequency components. Using a first processing technique, the computing device converts the low-frequency components of the audio signal into a first plurality of converted audio channels and convolves the first plurality of converted audio channels with the measured BRIR to generate a first left audio channel and a first right audio channel. With the disclosed techniques, the computing device further divides the measured BRIR into a first time window that includes the direct sound portion of the measured BRIR and a second time window that includes the reflected sound portion of the measured BRIR. Using a second processing technique, the computing device converts the high-frequency components of the audio signal into a second plurality of converted audio channels and convolves the second plurality of converted audio channels with the reflected sound portion of the measured BRIR to generate a second left audio channel and a second right audio channel. Using a third processing technique, the computing device convolves the discrete high-frequency components of the audio signal with the direct sound portion of the measured BRIR to generate a third left audio channel and a third right audio channel. The direct sound portion of the measured BRIR corresponds to a direction at which sound emitted by a source being rendered arrives directly at the cars of a listener. With the disclosed techniques, the computing device combines the results of the first, second, and third processing techniques to generate left and right car sounds that include reverberation. For example, the computing device combines the first, second, and third left audio channels into a single left audio channel and the combines the first, second, and third right audio channels into a single right audio channel. The computing device then outputs an output audio signal that includes the combined left audio channel and the combined right audio channel for playback by headphones. Before or after combining the left and right car audio channels, the computing device can optionally apply headphone equalization to the left and right audio channels.

At least one technical advantage of the disclosed techniques relative to the prior art is that, with the disclosed techniques, a measured room impulse response of an acoustic space can be used to add reverberation to an audio signal with a lower computational cost. Accordingly, with the disclosed techniques, relatively modest processing power can be used to render reverberation for a large number of sound sources and acoustic spaces based on measured room impulse responses, which sound more natural than room impulse responses derived from models of acoustic spaces. These technical advantages provide one or more technological improvements over prior art approaches.

1. In some embodiments, a computer-implemented method for audio processing comprises obtaining a binaural room impulse response (BRIR) of an acoustic space; receiving an input audio signal; separating the input audio signal into low-frequency components and high-frequency components; dividing the BRIR of the acoustic space into a first portion that occurs before a first time and a second portion that occurs after the first time; generating a first component of an output audio signal based on the high-frequency components of the input audio signal and the first portion of the BRIR; generating a second component of the output audio signal based on the high-frequency components of the input audio signal and the second portion of the BRIR; generating a third component of the output audio signal based on the low-frequency components of the input audio signal and the BRIR; and outputting the output audio signal.

2. The computer-implemented method according to clause 1, wherein the first portion of the BRIR includes a direct sound portion and the second portion of the BRIR includes a reflected sound portion.

3. The computer-implemented method according to clause 1 or clause 2, wherein generating the first component of the output audio signal comprises convolving the high-frequency components of the input audio signal with the first portion of the BRIR to generate a first left audio channel and a first right audio channel.

4. The computer-implemented method according to any of clauses 1-3, further comprising applying headphone equalization to the first left audio channel and the first right audio channel.

5. The computer-implemented method according to any of clauses 1-4, wherein the first portion of the BRIR corresponds to a direction at which sound emitted by a source in the acoustic space arrives directly at an ear of a listener.

6. The computer-implemented method according to any of clauses 1-5, wherein generating the second component of the output audio signal comprises converting the high-frequency components of the input audio signal into a first plurality of converted audio channels; and convolving the first plurality of converted audio channels with the second portion of the BRIR to generate a second left audio channel and a second right audio channel.

7. The computer-implemented method according to any of clauses 1-6, wherein converted the high-frequency components of the input audio signal into the first plurality of converted audio channels includes using a first-order Ambisonics encoder-decoder.

8. The computer-implemented method according to any of clauses 1-7, further comprising reducing a gain of the first plurality of converted audio channels before convolving the first plurality of converted audio channels with the second portion of the BRIR.

9. The computer-implemented method according to any of clauses 1-8, wherein generating the third component of the output audio signal comprises converting the low-frequency components of the input audio signal into a second plurality of converted audio channels; and convolving the second plurality of converted audio channels with the BRIR to generate a third left audio channel and a third right audio channel.

10. The computer-implemented method according to any of clauses 1-9, wherein obtaining the BRIR of the acoustic space includes measuring the BRIR of the acoustic space with a microphone.

11. The computer-implemented method according to any of clauses 1-10, wherein the output audio signal comprises a left channel and a right channel.

12. According to some embodiments, one or more non-transitory computer-readable storage media including instructions that, when executed by one or more processors at a computing device, cause the one or more processors to perform steps of obtaining a binaural room impulse response (BRIR) of an acoustic space; receiving an input audio signal; separating the input audio signal into low-frequency components and high-frequency components; dividing the BRIR of the acoustic space into a first portion that occurs before a first time and a second portion that occurs after the first time; generating a first component of an output audio signal based on the high-frequency components of the input audio signal and the first portion of the BRIR; generating a second component of the output audio signal based on the high-frequency components of the input audio signal and the second portion of the BRIR; generating a third component of the output audio signal based on the low-frequency components of the input audio signal and the BRIR; and outputting the output audio signal.

13. The one or more non-transitory computer-readable media according to clause 12, wherein the first portion of the BRIR includes a direct sound portion and the second portion of the BRIR includes a reflected sound portion.

14. The one or more non-transitory computer-readable media according to clause 12 or clause 13, wherein generating the first component of the output audio signal comprises convolving the high-frequency components of the input audio signal with the first portion of the BRIR to generate a first left audio channel and a first right audio channel; generating the second component of the output audio signal comprises converting the high-frequency components of the input audio signal into a first plurality of converted audio channels and convolving the first plurality of converted audio channels with the second portion of the BRIR to generate a second left audio channel and a second right audio channel; and generating the third component of the output audio signal comprises converting the low-frequency components of the input audio signal into a second plurality of converted audio channels and convolving the second plurality of converted audio channels with the BRIR to generate a third left audio channel and a third right audio channel.

15. The one or more non-transitory computer-readable media according to any of clauses 12-14, wherein the steps further comprise applying headphone equalization to the first left audio channel and the first right audio channel; applying headphone equalization to the second left audio channel and the second right audio channel; and applying headphone equalization to the third left audio channel and the third right audio channel.

16. The one or more non-transitory computer-readable media according to any of clauses 12-15, wherein the steps further comprise reducing a gain of the first plurality of converted audio channels before convolving the first plurality of converted audio channels with the second portion of the BRIR; and reducing a gain of the second plurality of converted audio channels before convolving the second plurality of converted audio channels with the BRIR.

17. The one or more non-transitory computer-readable media according to any of clauses 12-16, wherein converting the high-frequency components of the input audio signal into the first plurality of converted audio channels includes using a first-order Ambisonics encoder-decoder; and converting the low-frequency components of the input audio signal into the second plurality of converted audio channels includes using a first-order Ambisonics encoder-decoder.

18. The one or more non-transitory computer-readable media according to any of clauses 12-17, wherein obtaining the BRIR of the acoustic space includes measuring the BRIR of the acoustic space with a microphone.

19. According to some embodiments, a computing device comprising a memory storing an application and one or more processors that, when executing the application, are configured to obtain a binaural room impulse response (BRIR) of an acoustic space; receive an input audio signal; separate the input audio signal into low-frequency components and high-frequency components; divide the BRIR of the acoustic space into a first portion that occurs before a first time and a second portion that occurs after the first time; generate a first component of an output audio signal based on the high-frequency components of the input audio signal and the first portion of the BRIR; generate a second component of the output audio signal based on the high-frequency components of the input audio signal and the second portion of the BRIR; generate a third component of the output audio signal based on the low-frequency components of the input audio signal and the BRIR; and output the output audio signal.

20. The computing device according to clause 19, wherein the first portion of the BRIR includes a direct sound portion and the second portion of the BRIR includes a reflected sound portion.

Any and all combinations of any of the claim elements recited in any of the claims and/or any elements described in this application, in any fashion, fall within the contemplated scope of the present disclosure and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for audio processing, the method comprising:

- obtaining a binaural room impulse response (BRIR) of an acoustic space;
- receiving an input audio signal;
- separating the input audio signal into low-frequency components and high-frequency components;
- dividing the BRIR of the acoustic space into a first portion that occurs before a first time and a second portion that occurs after the first time;
- generating a first component of an output audio signal based on the high-frequency components of the input audio signal and the first portion of the BRIR;
- generating a second component of the output audio signal based on the high-frequency components of the input audio signal and the second portion of the BRIR;
- generating a third component of the output audio signal based on the low-frequency components of the input audio signal and the BRIR; and
- outputting the output audio signal.

2. The computer-implemented method of claim 1, wherein the first portion of the BRIR includes a direct sound portion and the second portion of the BRIR includes a reflected sound portion.

3. The computer-implemented method of claim 1, wherein generating the first component of the output audio signal comprises convolving the high-frequency components of the input audio signal with the first portion of the BRIR to generate a first left audio channel and a first right audio channel.

4. The computer-implemented method of claim 3, further comprising applying headphone equalization to the first left audio channel and the first right audio channel.

5. The computer-implemented method of claim 1, wherein the first portion of the BRIR corresponds to a direction at which sound emitted by a source in the acoustic space arrives directly at an ear of a listener.

6. The computer-implemented method of claim 1, wherein generating the second component of the output audio signal comprises:

- converting the high-frequency components of the input audio signal into a first plurality of converted audio channels; and
- convolving the first plurality of converted audio channels with the second portion of the BRIR to generate a second left audio channel and a second right audio channel.

7. The computer-implemented method of claim 6, wherein converted the high-frequency components of the input audio signal into the first plurality of converted audio channels includes using a first-order Ambisonics encoder-decoder.

8. The computer-implemented method of claim 6, further comprising reducing a gain of the first plurality of converted audio channels before convolving the first plurality of converted audio channels with the second portion of the BRIR.

9. The computer-implemented method of claim 1, wherein generating the third component of the output audio signal comprises:

converting the low-frequency components of the input audio signal into a second plurality of converted audio channels; and convolving the second plurality of converted audio channels with the BRIR to generate a third left audio channel and a third right audio channel.

10. The computer-implemented method of claim 1, wherein obtaining the BRIR of the acoustic space includes measuring the BRIR of the acoustic space with a microphone.

11. The computer-implemented method of claim 1, wherein the output audio signal comprises a left channel and a right channel.

12. One or more non-transitory computer-readable storage media including instructions that, when executed by one or more processors at a computing device, cause the one or more processors to perform steps of:

obtaining a binaural room impulse response (BRIR) of an acoustic space;

receiving an input audio signal;

separating the input audio signal into low-frequency components and high-frequency components;

dividing the BRIR of the acoustic space into a first portion that occurs before a first time and a second portion that occurs after the first time;

generating a first component of an output audio signal based on the high-frequency components of the input audio signal and the first portion of the BRIR;

generating a second component of the output audio signal based on the high-frequency components of the input audio signal and the second portion of the BRIR;

generating a third component of the output audio signal based on the low-frequency components of the input audio signal and the BRIR; and outputting the output audio signal.

13. The one or more non-transitory computer-readable storage media of claim 12, wherein the first portion of the BRIR includes a direct sound portion and the second portion of the BRIR includes a reflected sound portion.

14. The one or more non-transitory computer-readable storage media of claim 12, wherein:

generating the first component of the output audio signal comprises convolving the high-frequency components of the input audio signal with the first portion of the BRIR to generate a first left audio channel and a first right audio channel;

generating the second component of the output audio signal comprises:

converting the high-frequency components of the input audio signal into a first plurality of converted audio channels; and convolving the first plurality of converted audio channels with the second portion of the BRIR to generate a second left audio channel and a second right audio channel; and generating the third component of the output audio signal comprises:

converting the low-frequency components of the input audio signal into a second plurality of converted audio channels; and convolving the second plurality of converted audio channels with the BRIR to generate a third left audio channel and a third right audio channel.

15. The one or more non-transitory computer-readable storage media of claim 14, wherein the steps further comprise:

applying headphone equalization to the first left audio channel and the first right audio channel;

applying headphone equalization to the second left audio channel and the second right audio channel; and applying headphone equalization to the third left audio channel and the third right audio channel.

16. The one or more non-transitory computer-readable storage media of claim 14, wherein the steps further comprise:

reducing a gain of the first plurality of converted audio channels before convolving the first plurality of converted audio channels with the second portion of the BRIR; and reducing a gain of the second plurality of converted audio channels before convolving the second plurality of converted audio channels with the BRIR.

17. The one or more non-transitory computer-readable storage media of claim 14, wherein:

converting the high-frequency components of the input audio signal into the first plurality of converted audio channels includes using a first-order Ambisonics encoder-decoder; and converting the low-frequency components of the input audio signal into the second plurality of converted audio channels includes using a first-order Ambisonics encoder-decoder.

18. The one or more non-transitory computer-readable storage media of claim 12, wherein obtaining the BRIR of the acoustic space includes measuring the BRIR of the acoustic space with a microphone.

19. A computing device comprising:

a memory storing an application; and one or more processors that, when executing the application, are configured to:

obtain a binaural room impulse response (BRIR) of an acoustic space;

receive an input audio signal;

separate the input audio signal into low-frequency components and high-frequency components;

divide the BRIR of the acoustic space into a first portion that occurs before a first time and a second portion that occurs after the first time;

generate a first component of an output audio signal based on the high-frequency components of the input audio signal and the first portion of the BRIR;

generate a second component of the output audio signal based on the high-frequency components of the input audio signal and the second portion of the BRIR;

generate a third component of the output audio signal based on the low-frequency components of the input audio signal and the BRIR; and output the output audio signal.

20. The computing device of claim 19, wherein the first portion of the BRIR includes a direct sound portion and the second portion of the BRIR includes a reflected sound portion.

* * * * *